(12) United States Patent
Huang et al.

(10) Patent No.: US 11,019,549 B2
(45) Date of Patent: May 25, 2021

(54) CELL HANDOVER METHOD AND APPARATUS

(71) Applicant: CLOUDMINDS (SHANGHAI) ROBOTICS SYSTEMS CO., LTD., Shanghai (CN)

(72) Inventors: William Xiao-Qing Huang, Shenzhen (CN); Haitao Jiang, Shenzhen (CN); Zhenkai Wang, Shenzhen (CN)

(73) Assignee: CloudMinds (Shanghai) Robotics Co., Ltd., Shanghai (CN)

( * ) Notice: Subject to any disclaimer, the term of this patent is extended or adjusted under 35 U.S.C. 154(b) by 0 days.

(21) Appl. No.: 16/507,596

(22) Filed: Jul. 10, 2019

(65) Prior Publication Data

US 2019/0335376 A1    Oct. 31, 2019

Related U.S. Application Data

(63) Continuation of application No. PCT/CN2017/079118, filed on Mar. 31, 2017.

(51) Int. Cl.
*H04B 7/0408* (2017.01)
*H04B 17/00* (2015.01)
(Continued)

(52) U.S. Cl.
CPC .......... *H04W 36/32* (2013.01); *H04B 7/0408* (2013.01); *H04B 17/0082* (2013.01);
(Continued)

(58) Field of Classification Search
CPC .. H04B 7/02–12; H04B 17/0082–3913; H04L 5/003–0098; H04W 16/28; H04W 24/02–10; H04W 36/0005–385; H04W 48/02–20; H04W 64/003–006; H04W 72/005–14; H04W 84/02; H04W 84/04–045; H04W 88/02; H04W 88/04–12; H04W 92/02; H04W 92/04;
(Continued)

(56) References Cited

U.S. PATENT DOCUMENTS

2013/0235742 A1    9/2013  Josiam et al.
2014/0073329 A1    3/2014  Kang et al.
(Continued)

FOREIGN PATENT DOCUMENTS

CN    105491636 A    4/2016
CN    105519190 A    4/2016
(Continued)

*Primary Examiner* — Timothy J Weidner
(74) *Attorney, Agent, or Firm* — Hayes Soloway PC

(57) ABSTRACT

Disclosed in the present disclosure are a cell handover method and apparatus. The method comprises: sending measurement configuration information to a terminal to be handed over, wherein the measurement configuration information comprises beam configuration information; after the terminal measures neighboring cells according to the measurement configuration information, receiving beam measurement results sent by the terminal according to the beam configuration information; and determining, according to the beam measurement results, a target cell to which the terminal is to be handed over, and handing over the terminal to the target cell by means of a target network device.

13 Claims, 7 Drawing Sheets

(51) Int. Cl.
*H04B 17/309* (2015.01)
*H04W 24/10* (2009.01)
*H04W 36/00* (2009.01)
*H04W 36/30* (2009.01)
*H04W 36/32* (2009.01)
*H04W 72/04* (2009.01)
*H04W 84/04* (2009.01)
*H04W 88/02* (2009.01)
*H04W 88/08* (2009.01)
*H04W 92/02* (2009.01)
*H04W 92/10* (2009.01)
*H04W 92/20* (2009.01)

(52) U.S. Cl.
CPC .......... *H04B 17/309* (2015.01); *H04W 24/10* (2013.01); *H04W 36/0058* (2018.08); *H04W 36/0061* (2013.01); *H04W 36/0094* (2013.01); *H04W 36/30* (2013.01); *H04W 72/042* (2013.01); *H04W 72/046* (2013.01); *H04W 72/0426* (2013.01); *H04W 84/04* (2013.01); *H04W 88/02* (2013.01); *H04W 88/08* (2013.01); *H04W 92/02* (2013.01); *H04W 92/10* (2013.01); *H04W 92/20* (2013.01)

(58) Field of Classification Search
CPC ..... H04W 92/10; H04W 92/12; H04W 92/16; H04W 92/20; H04W 92/22
See application file for complete search history.

(56) References Cited

U.S. PATENT DOCUMENTS

| | | | |
|---|---|---|---|
| 2014/0153423 | A1 | 6/2014 | Shin et al. |
| 2018/0279181 | A1* | 9/2018 | Hampel ............ H04W 36/0033 |
| 2019/0222291 | A1* | 7/2019 | Wang .................... H04W 24/10 |
| 2019/0313314 | A1* | 10/2019 | Yang ..................... H04W 24/08 |
| 2019/0327629 | A1* | 10/2019 | Zhang ................. H04B 7/0626 |
| 2019/0349819 | A1* | 11/2019 | Xu ..................... H04W 36/0033 |
| 2019/0357069 | A1* | 11/2019 | Harada ................. H04W 24/10 |

FOREIGN PATENT DOCUMENTS

| | | |
|---|---|---|
| CN | 106301505 A | 1/2017 |
| CN | 106341873 A | 1/2017 |
| EP | 3122093 A1 | 1/2017 |
| JP | 2008035287 A | 2/2008 |
| JP | 2017509184 A | 3/2017 |
| WO | 2015100533 A1 | 7/2015 |
| WO | 2015150021 A1 | 10/2015 |
| WO | 2016095984 A1 | 6/2016 |

\* cited by examiner

CELL HANDOVER METHOD AND APPARATUS

CROSS-REFERENCE TO RELATED APPLICATION

The present application is a continuation application under 35 U.S.C. § 120 of PCT application No. PCT/CN2017/079118 filed on Mar. 31, 2017, the contents of which are incorporated herein by reference.

FIELD OF THE INVENTION

The present disclosure relates to the communication filed, and more particularly to a cell handover method and apparatus.

BACKGROUND OF THE INVENTION

In a communication system, when a terminal is moved from one cell (referring to a base station or the coverage of a base station) to another cell, in order to keep the terminal communication uninterrupted, a channel handover is required.

A cell handover of an existing 4G network is based on the reporting of the RSRP (Reference Signal Receiving Power)/RSRQ (Reference Signal Receiving Quality) of an reference symbol of a neighboring cell by a terminal, and a serving cell performs a decision and interacts with a target cell to complete the cell handover.

However, since an existing handover is based on the reporting of the RSRP/RSRQ of a reference symbol, only the service quality of a cell itself is considered, and therefore, a determined target cell may not be the best target cell.

SUMMARY OF THE INVENTION

In order to solve the above problems, the present disclosure provides a cell handover method and apparatus.

In order to achieve the above objective, according to a first aspect of an embodiment of the present disclosure, provided is a cell handover method, applied to a serving base station, comprising: sending measurement configuration information to a terminal to be handed over, wherein the measurement configuration information comprises beam configuration information; after the terminal measures neighboring cells according to the measurement configuration information, receiving beam measurement results sent by the terminal according to the beam configuration information; and determining, according to the beam measurement results, a target cell to which the terminal is to be handed over, and handing over the terminal to the target cell by means of a target network device.

According to a second aspect of an embodiment of the present disclosure, provided is a cell handover method, applied to a terminal, comprising: receiving measurement configuration information sent by a serving base station of a current cell, wherein the measurement configuration information comprises beam configuration information; measuring, according to the measurement configuration information, beams of neighboring cells of the current cell; sending beam measurement results to the serving base station according to the beam configuration information; after the serving base station determines a target cell to which the terminal is to be handed over according to the beam measurement result, receiving a handover instruction message sent by the serving base station; and handing over to the target cell according to the handover instruction message.

According to a third aspect of an embodiment of the present disclosure, provided is a cell handover method, applied to a target network device, comprising: receiving a handover request message sent by a serving base station, wherein the handover request message comprises beam measurement results of a target cell determined by the serving base station; determining a target beam in the target cell according to the beam measurement results; and sending a handover response message to the serving base station, wherein the handover response message comprises a beam identifier of the target beam, so that the serving base station hands over a terminal to the target cell by means of the target beam.

According to a fourth aspect of an embodiment of the present disclosure, provided is a cell handover apparatus, applied to a serving base station, comprising: a first sending module configured to send measurement configuration information to a terminal to be handed over, wherein the measurement configuration information comprises beam configuration information; a first receiving module configured to receive beam measurement results sent by the terminal according to the beam configuration information after the terminal measures neighboring cells according to the measurement configuration information; and a cell determining module configured to determine, according to the beam measurement results, a target cell to which the terminal is to be handed over, and hand over the terminal to the target cell by means of a target network device.

According to a fifth aspect of an embodiment of the present disclosure, provided is a cell handover apparatus applied to a terminal, comprising: a second receiving module configured to receive measurement configuration information sent by a serving base station of a current cell, wherein the measurement configuration information comprises beam configuration information. a measuring module configured to measure, according to the measurement configuration information, beams of neighboring cells of the current cell; a second sending module configured to send beam measurement results to the serving base station according to the beam configuration information; a third receiving module configured to receive a handover instruction message sent by the serving base station after the serving base station determines a target cell to which the terminal is to be handed over according to the beam measurement results; and a handover module configured to hand over to the target cell according to the handover instruction message.

According to a sixth aspect of an embodiment of the present disclosure, provided is a cell handover apparatus, applied to a target network device, comprising: a request message receiving module configured to receive a handover request message sent by a serving base station, wherein the handover request message comprises beam measurement results of a target cell determined by the serving base station; a beam determining module configured to determine a target beam in the target cell according to the beam measurement results; and a third sending module configured to send a handover response message to the serving base station, wherein the handover response message comprises a beam identifier of the target beam, so that the serving base station hands over the terminal to the target cell by means of the target beam.

According to a seventh aspect of an embodiment of the present disclosure, provided is a non-transitory computer readable storage medium, comprising one or more programs for executing the method according to the above first aspect.

According to an eighth aspect of an embodiment of the present disclosure, provided is a serving base station, comprising the non-transitory computer readable storage medium according to the above seventh aspect; and one or more processors for executing a program in the non-transitory computer readable storage medium.

According to a ninth aspect of an embodiment of the present disclosure, provided is a non-transitory computer readable storage medium, comprising one or more programs for executing the method according to the above second aspect.

According to a tenth aspect of an embodiment of the present disclosure, provided is a terminal, comprising the non-transitory computer readable storage medium according to the above ninth aspect; and one or more processors for executing a program in the non-transitory computer readable storage medium.

According to an eleventh aspect of an embodiment of the present disclosure, provided is a non-transitory computer readable storage medium, comprising one or more programs for executing the method according to the above third aspect. According to a twelfth aspect of an embodiment of the present disclosure, provided is a target network device, comprising the non-transitory computer readable storage medium according to the above eleventh aspect; and one or more processors for executing a program in the non-transitory computer readable storage medium.

Using the above technical solutions, the serving base station sends measurement configuration information to a terminal to be handed over, wherein the measurement configuration information comprises beam configuration information; after the terminal measures neighboring cells according to the measurement configuration information, the beam measurement results sent by the terminal according to the beam configuration information are received; a target cell to which the terminal is to be handed over is determined according to the beam measurement results, and the terminal is handed over to the target cell by means of a target network device. In this way, when performing a cell handover, the target cell is determined according to the beam measurement results by measuring the neighboring cells. Compared with the prior art, the present disclosure can perform cell measurement based on beam level and determine an optimal target cell based on beam measurement results, thereby improving service quality.

DETAILED DESCRIPTION OF THE EMBODIMENTS

The specific embodiments of the present disclosure will be described in detail below in conjunction with the drawings. It is to be understood that the specific embodiments described herein are only used for illustrating and interpreting the present disclosure and are not intended to limit the present disclosure.

An embodiment of the present disclosure may be applied to a 5G network. In 5G networks, ultra-dense network is an important technical direction for the 5G networks. In the future, the density of the 5G networks may reach 10 times or even higher than that of existing 4G networks. This means that, compared to 4G networks, terminals of future 5G networks will likely detect 10 times or more of the number of base stations simultaneously. In addition, in order to provide ultra-high-rate services, 5G will use the millimeter wave bands, and in order to overcome the significant increase in propagation loss, Massive MIMO (Massive Multiple-Input Multiple-Output) is needed to compensate for the gain provided by beamforming. Synchronization information, broadcast information, mobility related reference symbols and user data of a cell will be sent based on beams. After using the large-scale antenna array technology in the millimeter wave band, each cell will have more than 10 analog beams, and the mobility management of a terminal will also be related to beams, comprising beam-based measurement, cell quality evaluation, cell selection and handover, and so on. The present disclosure provides a cell handover method and apparatus. When performing measurement of neighboring cells, the beams of the neighboring cells are measured, and the beam measurement results are reported to a serving base station. The serving base station determines, according to the beam measurement results, a target cell to which a terminal is to be handed over, and hands over the terminal to the target cell by means of a target network device. In this way, when performing a cell handover, the present disclosure can perform cell measurement based on beam level, and determine an optimal target cell according to beam measurement results, so that a user can hand over to the cell, thereby improving service quality.

The present disclosure will be described in detail below in conjunction with specific embodiments.

Figure 1:
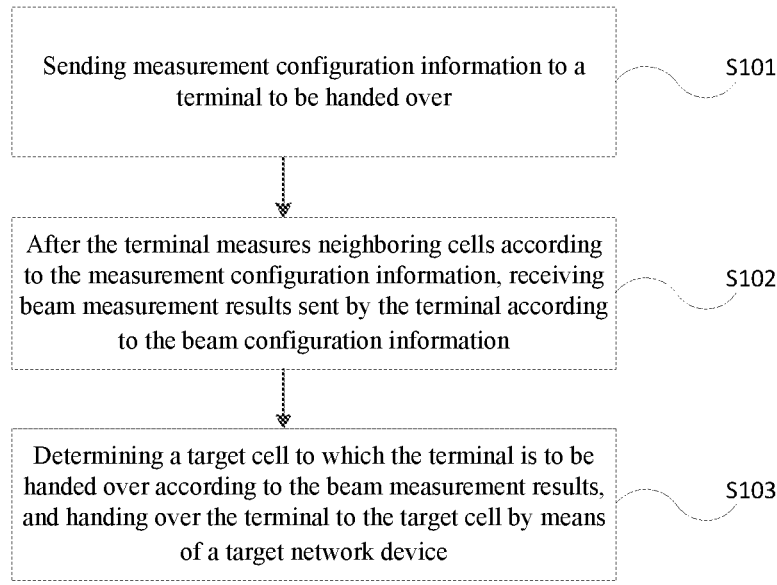
FIG. 1 is a flowchart of a cell handover method provided by an embodiment of the present disclosure.

FIG. 1 shows a cell handover method provided in an embodiment of the present disclosure. As shown in FIG. 1, the method is applied to a serving base station, wherein the serving base station is a base station of a current cell where a terminal to be handed over is located, and the method comprises:

S101, sending measurement configuration information to a terminal to be handed over.

The terminal to be handed over may be a terminal in a connected state or an inactive state, and the measurement configuration information may comprise the frequency points of the neighboring cell, the identifiers of the neighboring cells, the measurement flags for instructing to measure serving quality of the neighboring cells, and beam configuration information, so that the terminal measures the neighboring cells according to the above information. The beam configuration information may comprise a reported threshold and a reported number of the beam measurement results, and the beam configuration information indicates that the beam measurement result is reported when the beam measurement result meets the reported threshold, and the number of reported beam measurement results is less than or equal to the reported number. The beam measurement result may be receiving power or receiving quality of a beam reference symbol. The receiving power refers to the strength of the signal power of a receiving beam reference symbol, and the receiving quality refers to the signal to noise ratio of a signal of a receiving beam reference symbol.

S102, after the terminal measures neighboring cells according to the measurement configuration information, receiving beam measurement results sent by the terminal according to the beam configuration information.

S103, determining a target cell to which the terminal is to be handed over according to the beam measurement results, and handing over the terminal to the target cell by means of a target network device.

The target network device comprises a base station of the target cell or a mobility management server, wherein the mobility management server is used for mobility management of a terminal in a network, and the mobility management server may be located at the base station side, or may be independently arranged and connected to multiple base stations.

In this way, when performing a cell handover, the present disclosure can perform cell measurement based on beam level, and determine an optimal target cell according to beam measurement results, so that a terminal is handed over to the cell, thereby improving service quality.

Figure 2:
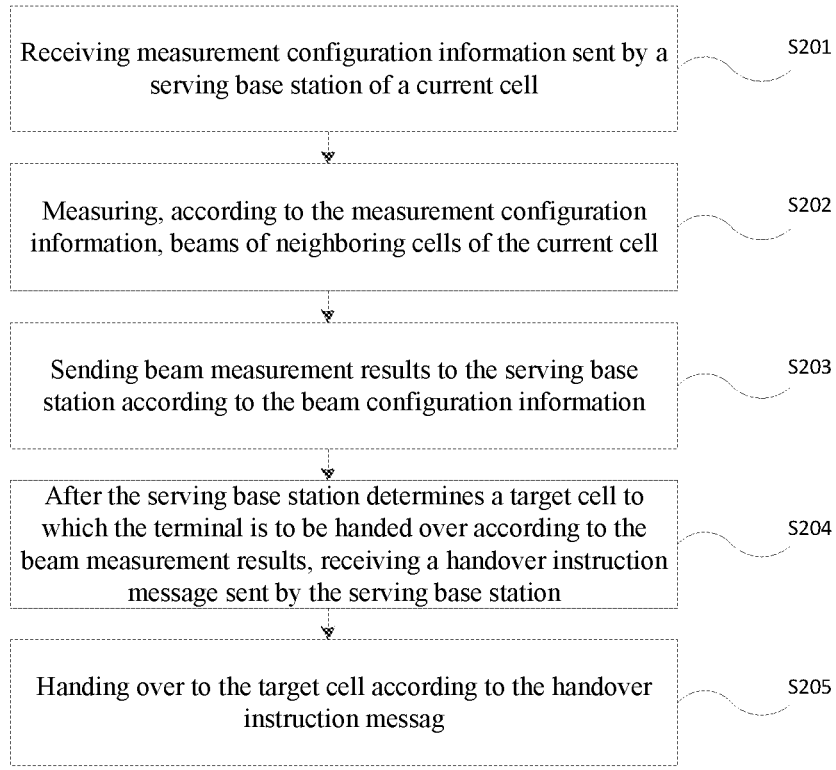
FIG. 2 is a flowchart of another cell handover method provided by an embodiment of the present disclosure.

FIG. 2 shows a cell handover method provided in an embodiment of the present disclosure. As shown in FIG. 2, the method is applied to a terminal, and the terminal to be handed over may be a terminal in a connected state or an inactive state, and the method comprises:

S201, receiving measurement configuration information sent by a serving base station of a current cell;

Wherein, the measurement configuration information may comprise frequency points of neighboring cells, identifiers of the neighboring cells, the measurement flags for instructing to measure serving quality of the neighboring cells, and beam configuration information, so that the terminal measures the neighboring cells according to the above information. The beam configuration information may comprise a reported threshold and a reported number of the beam measurement results, and the beam configuration information indicates that the beam measurement result is reported when the beam measurement result meets the reported threshold, and the number of reported beam measurement results is less than or equal to the reported number. The beam measurement result may be receiving power or receiving quality of a beam reference symbol. The receiving power refers to the strength of the signal power of a receiving beam reference symbol, and the receiving quality refers to the signal to noise ratio of a signal of a receiving beam reference symbol.

S202, measuring, according to the measurement configuration information, beams of neighboring cells of the current cell.

Wherein, the receiving power or the receiving quality of a beam reference symbol of the neighboring cell may be measured.

S203, sending beam measurement results to the serving base station according to the beam configuration information;

S204, after the serving base station determines a target cell to which the terminal is to be handed over according to the beam measurement results, receiving a handover instruction message sent by the serving base station;

S205, handing over to the target cell according to the handover instruction message. In this way, when performing a cell handover, the present disclosure can perform cell measurement based on beam level, and perform cell handover according to the beam measurement results, thereby improving service quality.

Figure 3:
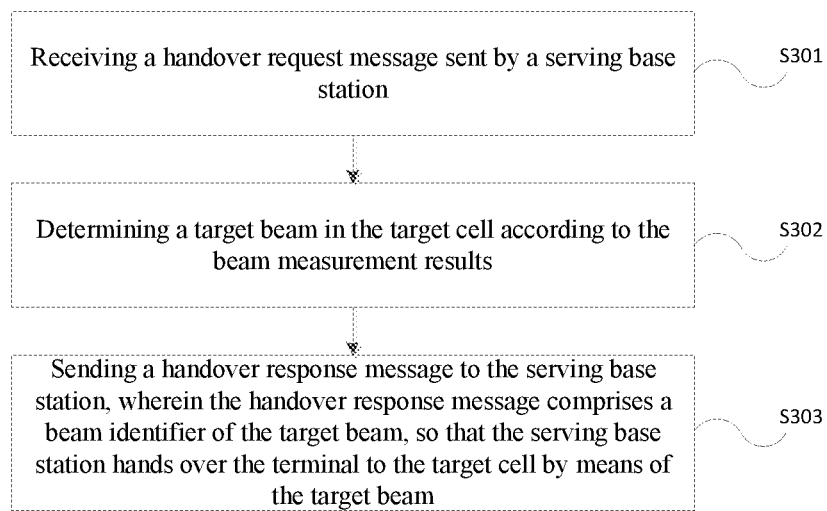
FIG. 3 is a flowchart of a third cell handover method provided by an embodiment of the present disclosure.

FIG. 3 shows a cell handover method provided by an embodiment of the present disclosure. As shown in FIG. 3, the method is applied to a target network device. The target network device comprises a base station of a target cell or a mobility management server, wherein the mobility management server is used for mobility management of a terminal in a network, and the mobility management server may be located at the base station side, or may be independently arranged and connected to multiple base stations. The method comprises:

S301, receiving a handover request message sent by a serving base station.

The handover request message comprises the beam measurement results of a target cell determined by the serving base station. The beam measurement result may be receiving power or receiving quality of a beam reference symbol. The receiving power refers to the strength of the signal power of a receiving beam reference symbol, and the receiving quality refers to the signal to noise ratio of a signal of a receiving beam reference symbol.

S302, determining a target beam in the target cell according to the beam measurement results.

S303, sending a handover response message to the serving base station, wherein the handover response message comprises a beam identifier of the target beam, so that the serving base station hands over the terminal to the target cell by means of the target beam.

In this way, when performing a cell handover, the present disclosure can perform cell measurement based on beam level, and determine a target beam according to the beam measurement results, so that the terminal performs handover by means of the target beam, thereby improving service quality. In addition, in the prior art, after a terminal is handed over to a target cell, it is also required to perform polling measurement on an analog beam of the target cell, and re-initiate a random access request or report appropriate serving information. In this way, not only the air interface resources are wasted, but also the handover delay is greatly increased, thereby affecting the service quality. In the present disclosure, a terminal directly initiates connection on a determined target beam, and does not need to re-initiate a random access request or report appropriate serving information, thereby saving air interface resources and reducing handover delay.

Figure 4:
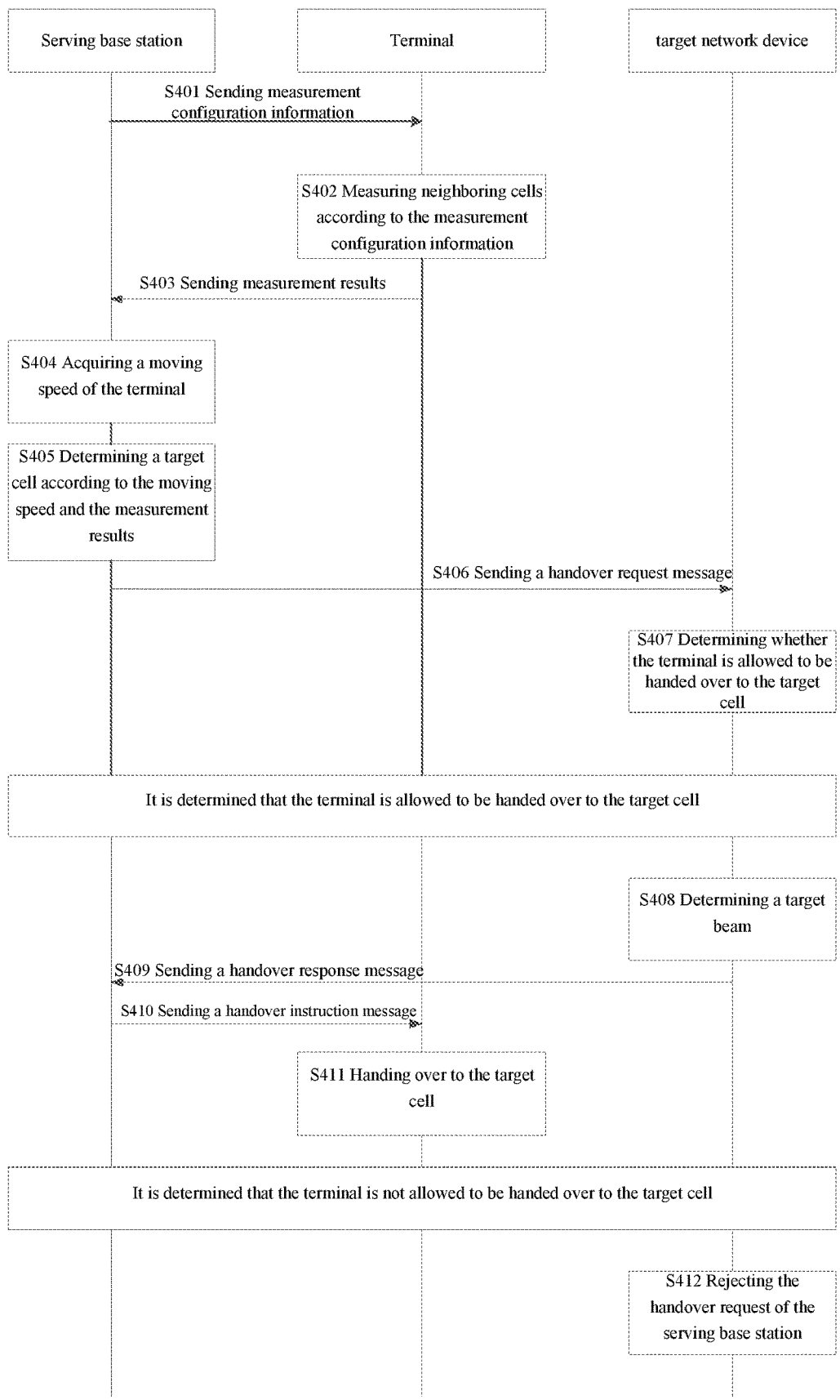
FIG. 4 is a flowchart of a fourth cell handover method provided by an embodiment of the present disclosure.

FIG. 4 shows a cell handover method provided by an embodiment of the present disclosure. As shown in FIG. 4, the method comprises:

S401, a serving base station sending measurement configuration information to a terminal.

Wherein, the terminal to be handed over may be a terminal in a connected state or an inactive state, and the measurement configuration information may comprise the frequency points of the neighboring cells, the identifiers of the neighboring cells, serving quality of the neighboring cells, and beam configuration information. The beam configuration information may comprise a reported threshold and a reported number of the beam measurement results, and the beam configuration information indicates that the beam measurement result is reported when the beam measurement result meets the reported threshold, and the number of reported beam measurement results is less than or equal to the reported number.

S402, the terminal measuring neighboring cells of the current cell where the terminal is located according to the measurement configuration information.

In this step, the terminal measures the neighboring cells according to the frequency points of the neighboring cells, the identifiers of the neighboring cells, serving quality of the neighboring cells and beam configuration information in the measurement configuration information to obtain the measurement results. The measurement result comprises the measured serving quality of the neighboring cell and the beam measurement result obtained by performing beam measurement on the neighboring cell. The beam measurement result may be obtained by measuring receiving power or receiving quality of a beam reference symbol of the neighboring cell. The receiving power refers to the strength of the signal power of a receiving beam reference symbol, and the receiving quality refers to the signal to noise ratio of a signal of a receiving beam reference symbol.

S403, the terminal sending the measured measurement results to a serving base station.

The measurement results may comprise serving quality of the neighboring cells and the beam measurement results. In this step, the terminal sends the serving quality of the neighboring cells in the measurement result to the serving base station, and sends the beam measurement results to the serving base station according to beam configuration information.

The beam configuration information may comprise a reported threshold and a reported number of the beam measurement results. In this way, after the terminal measures the beams of the neighboring cell, the number of beams on which the beam measurement result is greater than or equal to the reported threshold may be determined; when the number of beams is greater than or equal to the reported number, the first beam measurement results are sent to the serving base station, and when the number of beams is less than the reported number, the second beam measurement result are sent to the serving base station, wherein the first beam measurement results comprises beam measurement values of M beams with the highest beam measurement results in the neighboring cell, where M is the reported number; and the second beam measurement results comprises beam measurement values of N beams with the highest beam measurement results in the neighboring cell, where N is the number of beams.

It should be noted that, since one neighboring cell may comprise a plurality of beams, in order to enable the serving base station to distinguish beam measurement results of different beams, the terminal may distinguish it by means of the beam identifier when sending the beam measurement result to the serving base station. In a possible implementation manner, the terminal may carry a corresponding beam identifier in the beam measurement result, so that the serving base station distinguishes the beam measurement result according to the beam identifier. In another possible implementation manner, the serving base station stores a reference symbol sequence identifier (such as a beam number, etc.) corresponding to a beam identifier. Therefore, when the terminal measures a neighboring cell, it can be known which reference symbol sequence identifier corresponds to a measured beam, and the reference symbol sequence identifier corresponding to the beam identifier is carried in the beam measurement result. Thus, the serving base station identifies the corresponding beam identifier according to the reference symbol sequence identifier, thereby distinguishing the beam measurement result.

S404, the serving base station acquiring a moving speed of the terminal.

S405, the serving base station determining a target cell to which the terminal is to be handed over, according to the moving speed of the terminal and the beam measurement results in the measurement results.

In this step, the target cell can be determined in the following manner:

when the moving speed is greater than or equal to a first preset speed threshold, the to-be-determined cells having serving quality greater than or equal to a first preset quality threshold is determined from the neighboring cells, and the number of first beams of each to-be-determined cell is determined, and a to-be-determined cell with the largest number of the first beams is determined as the target cell. Wherein the first beams are beams having the beam measurement result greater than or equal to the reported threshold.

In this way, when a high mobility terminal is handed over to the target cell, it is guaranteed that a plurality of beams can be serving the terminal in the mobile range to ensure its mobility requirement, thus avoiding the situation that when there is the highest serving quality in a certain target cell, but only one beam exceeds the reported threshold, after the terminal is handed over, the location change within the handover delay may result in no suitable beam serving the terminal after handover to the target cell.

When the moving speed is less than the first preset speed threshold and greater than or equal to a second preset speed threshold, two optional processing manners may be available. One processing manner is to determine a cell with the highest serving quality as the target cell; and the other processing manner is to determine any cell in the to-be-determined cells as the target cell; in this way, due to the situation of arbitrary selection, there are statistically good random characteristics, and the probability that any one cell is selected is the same in a long time, so that the load tends to be balanced. When the moving speed is less than the second preset speed threshold, the cell with the highest serving quality is determined as the target cell.

S406, the serving base station sending a handover request message to a target network device.

The target network device comprises a base station of the target cell or a mobility management server, wherein the mobility management server is used for mobility management of a terminal in a network, and the mobility management server may be located at the base station side, or may be independently arranged and connected to multiple base stations. The handover request message comprises a terminal identifier, a handover type (such as a intra-frequency handover, an inter-frequency handover, and a inter-system handover, etc.), a handover reason (such as a coverage-based handover, a load-based handover, and a service-based handover, etc.), terminal context information (such as authentication information of the terminal, a negotiated security algorithm, a generated secret key, and bearer information, etc.) and the beam measurement results of the target cell. It should be noted that the beam measurement results of the target cell may be the beam measurement results that are greater than or equal to the reported threshold.

S407, the target network device determining, according to the beam measurement results, whether the terminal is allowed to be handed over to the target cell.

In this step, firstly, the beam load corresponding to the beam measurement results may be determined, and secondly, it is determined in the beam load whether second beams having the load less than or equal to a preset load threshold exist, and when it is determined that the second beams exist, the terminal is allowed to be handed over to the target cell.

When it is determined that the terminal is allowed to be handed over to the target cell, step S408 to step S411 are performed;

When it is determined that the terminal is not allowed to be handed over to the target cell, step 412 is performed.

S408, the target network device determining a target beam in the target cell according to the beam measurement results;

In a possible implementation manner, the target network device may determine that a beam with the largest beam measurement result in the second beams is the target beam.

S409, the target network device sending a handover response message to the serving base station.

The handover response message may comprise information such as a target cell identifier, identifier information allocated by the base station of the target cell for the terminal, an access resource allocated by the base station of the target cell for the terminal, and a beam identifier of the target beam, etc.

S410, the serving base station sending a handover instruction message comprising the beam identifier to the terminal.

The handover instruction information may be a handover instruction or an RRC (Radio Resource Control) reestablishment message (such as an RRC reestablishment message may be adopted when the handover fails according to the handover instruction). The handover instruction or the RRC reestablishment message may comprise information such as a target cell identifier, identifier information allocated by the base station of the target cell for the terminal, an access resource allocated by the base station of the target cell for the terminal, and a beam identifier of the target beam, etc.

S411, the terminal being handed over to the target cell by means of a target beam indicated by the beam identifier in the handover instruction message.

The terminal initiates an access request on the target beam of the target cell according to the handover instruction information, thereby being handed over to the target cell, and after being handed over to the target cell, the base station of the target cell sends a handover complete message to the serving base station or the mobility management server.

S412, the target network device rejecting the handover request of the serving base station.

In this way, when performing a cell handover, the present disclosure can perform cell measurement based on beam level, and determine a target beam according to the beam measurement results, so that the terminal performs handover by means of the target beam, thereby improving service quality. In addition, in the prior art, after a terminal is handed over to a target cell, it is also required to perform polling measurement on an analog beam of the target cell, and re-initiate a random access request or report appropriate serving information. In this way, not only the air interface resources are wasted, but also the handover delay is greatly increased, thereby affecting the service quality. In the present disclosure, a terminal directly initiates connection on a determined target beam, and does not need to re-initiate a random access request or report appropriate serving information, thereby saving air interface resources and reducing handover delay.

It should be noted that, in the above method embodiments, a series of action combinations are described for the sake of simple description. However, those skilled in the art should be aware that the present invention is not limited by the described sequence of actions, because certain steps may be performed in other sequences or concurrently in accordance with the present disclosure. Secondly, those skilled in the art should also be aware that the embodiments described in the description are preferred embodiments and that the actions and modules involved are not necessarily required by the present invention.

Figure 5:
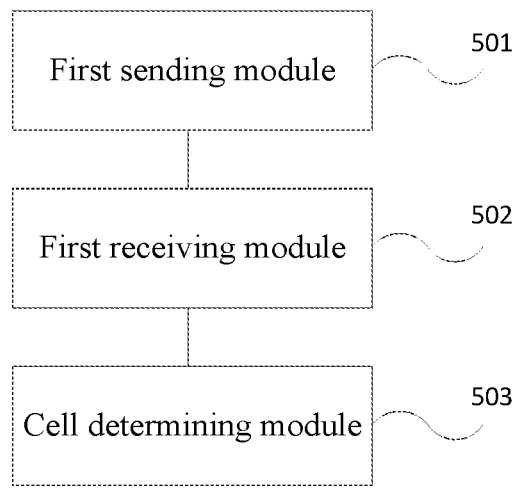
FIG. 5 is a structural schematic diagram of a cell handover apparatus provided by an embodiment of the present disclosure.

FIG. 5 is a cell handover apparatus provided by an embodiment of the present invention. As shown in FIG. 5, the apparatus is applied to a serving base station, and the apparatus comprises:

a first sending module 501 configured to send measurement configuration information to a terminal to be handed over, wherein the measurement configuration information comprises beam configuration information a first receiving module 502 configured to receive beam measurement results sent by the terminal according to the beam configuration information after the terminal measures neighboring cells according to the measurement configuration information; and a cell determining module 503 configured to determine, according to the beam measurement results, a target cell to which the terminal is to be handed over, and hand over the terminal to the target cell by means of a target network device.

Optionally, the beam configuration information comprises a reported threshold and a reported number of the beam measurement results.

Figure 6:
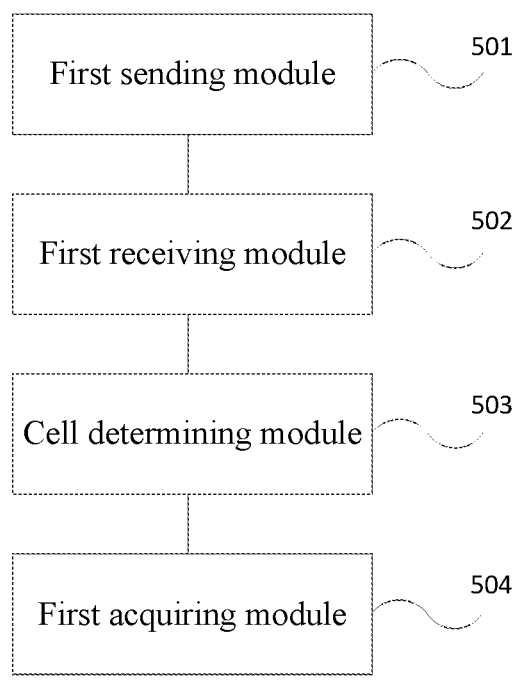
FIG. 6 is a structural schematic diagram of another cell handover apparatus provided by an embodiment of the present disclosure.

Optionally, as shown in FIG. 6, the apparatus further comprises:

a first acquiring module 504 configured to acquire a moving speed of the terminal.

The cell determining module 503 is configured to determine, according to the moving speed and the beam measurement results, a target cell to which the terminal is to be handed over.

Optionally, the cell determining module 503 is configured to, when the moving speed is greater than or equal to a first preset speed threshold, determine, from the neighboring cells, the to-be-determined cells having serving quality greater than or equal to a first preset quality threshold, and determine the number of first beams of each to-be-determined cell, and determine a to-be-determined cell with the largest number of the first beams as the target cell, wherein the first beams are beams having the beam measurement result greater than or equal to the reported threshold; when the moving speed is less than the first preset speed threshold and greater than or equal to a second preset speed threshold, determine a cell with the highest serving quality as the target cell, or determine any cell in the to-be-determined cells as the target cell; and when the moving speed is less than the second preset speed threshold, determine the cell with the highest serving quality as the target cell.

Figure 7:
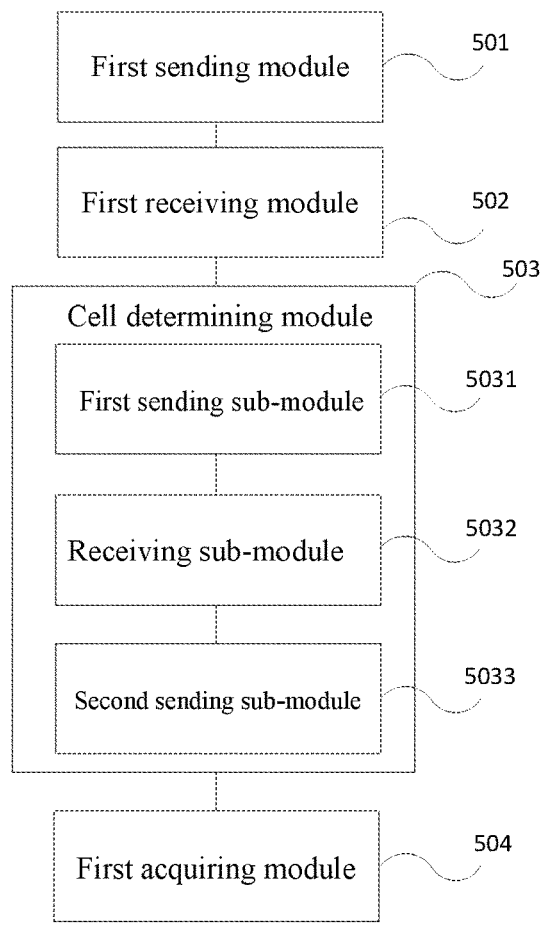
FIG. 7 is a structural schematic diagram of a third cell handover apparatus provided by an embodiment of the present disclosure.

Optionally, as shown in FIG. 7, the cell determining module 503 comprises: a first sending sub-module 5031 configured to send a handover request message to a target network device, wherein the handover request message comprises the beam measurement results of the target cell, so that the target network device determines, according to the beam measurement results, whether the terminal is allowed to be handed over to the target cell;

a receiving sub-module 5032 configured to receive a handover response message sent by the target network device after the target network device allows the terminal to be handed over to the target cell, and determines a target beam in the target cell according to the beam measurement results, wherein the handover response message comprises a beam identifier of the target beam; and a second sending sub-module 5033 configured to send, to the terminal, a handover indication message that comprises the beam identifier, so that the terminal is handed over to the target cell by means of the target beam according to the beam identifier. In this way, when performing a cell handover, the present disclosure can perform cell measurement based on beam level, and determine an optimal target cell according to beam measurement results, so that a terminal is handed over to the cell, thereby improving service quality.

It should be noted that those skilled in the art should be aware that for the convenience and brevity of the description, the specific working process and description of the apparatus described above may refer to the corresponding processes in the above method embodiments, and details will not be repeated herein.

Figure 8:
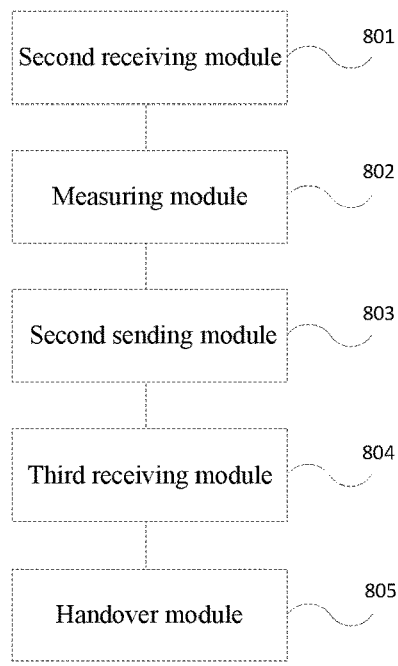
FIG. 8 is a structural schematic diagram of a fourth cell handover apparatus provided by an embodiment of the present disclosure.

FIG. 8 shows a cell handover apparatus provided by an embodiment of the present invention. As shown in FIG. 8, the apparatus is applied to a terminal, and the apparatus comprises:

a second receiving module 801 configured to receive measurement configuration information sent by a serving base station of a current cell, wherein the measurement configuration information comprises beam configuration information;

a measuring module 802 configured to measure, according to the measurement configuration information, beams of neighboring cells of the current cell;

a second sending module 803 configured to send beam measurement results to the serving base station according to the beam configuration information;

a third receiving module 804 configured to receive a handover instruction message sent by the serving base station after the serving base station determines a target cell to which the terminal is to be handed over according to the beam measurement results; and a handover module 805 configured to hand over to the target cell according to the handover instruction message.

Optionally, the beam configuration information comprises a reported threshold and a reported number of the beam measurement results.

The second sending module 803 is configured to determine the number of beams on which the beam measurement result is greater than or equal to the reported threshold; when the number of beams is greater than or equal to the reported number, send the first beam measurement results to the serving base station, wherein the first beam measurement results comprise beam measurement values of M beams with the highest beam measurement results in the neighboring cell, where M is the reported number; and when the number of beams is less than the reported number, send the second beam measurement results to the serving base station, wherein the second beam measurement results comprises the beam measurement values of N beams with the highest beam measurement results in the neighboring cell, where N is the number of beams.

Optionally, the handover instruction message comprises a beam identifier of the target beam.

The handover module 805 is configured to hand over to the target cell by means of the target beam according to the beam identifier.

In this way, when performing a cell handover, the present disclosure can perform cell measurement based on beam level, and performs handover according to the beam measurement result, thereby improving service quality.

It should be noted that those skilled in the art should be aware that for the convenience and brevity of the description, the specific working process and description of the apparatus described above may refer to the corresponding processes in the above method embodiments, and details will not be repeated herein.

Figure 9:
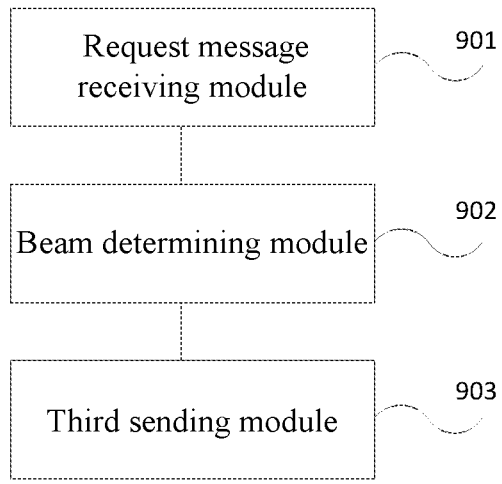
FIG. 9 is a structural schematic diagram of a fifth cell handover apparatus provided by an embodiment of the present disclosure.

FIG. 9 shows a cell handover apparatus provided by an embodiment of the present invention. As shown in FIG. 9, the apparatus is applied to a target network device, and the apparatus comprises:

a request message receiving module 901 configured to receive a handover request message sent by a serving base station, wherein the handover request message comprises beam measurement results of a target cell determined by the serving base station;

a beam determining module 902 configured to determine a target beam in the target cell according to the beam measurement results; and a third sending module 903 configured to send a handover response message to the serving base station, wherein the handover response message comprises a beam identifier of the target beam, so that the serving base station hands over the terminal to the target cell by means of the target beam.

Figure 10:
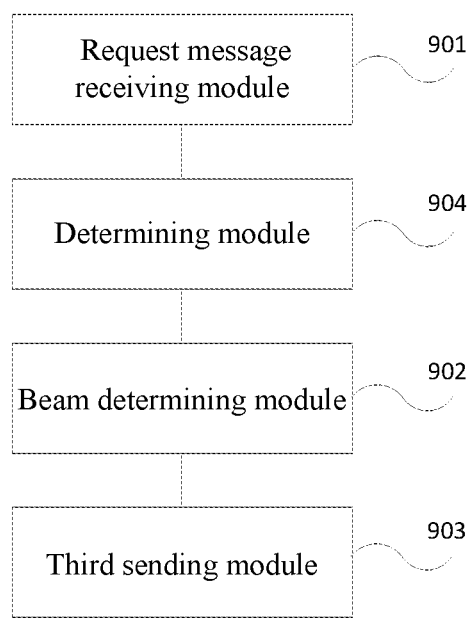
FIG. 10 is a structural schematic diagram of a sixth cell handover apparatus provided by an embodiment of the present disclosure.

Optionally, as shown in FIG. 10, the apparatus further comprises:

a determining module 904 configured to determine, according to the beam measurement results, whether the terminal is allowed to be handed over to the target cell.

The beam determining module 902 is configured to determine, when it is determined that the terminal is allowed to be handed over to the target cell according to the beam measurement results, a target beam in the target cell according to the beam measurement results.

Figure 11:
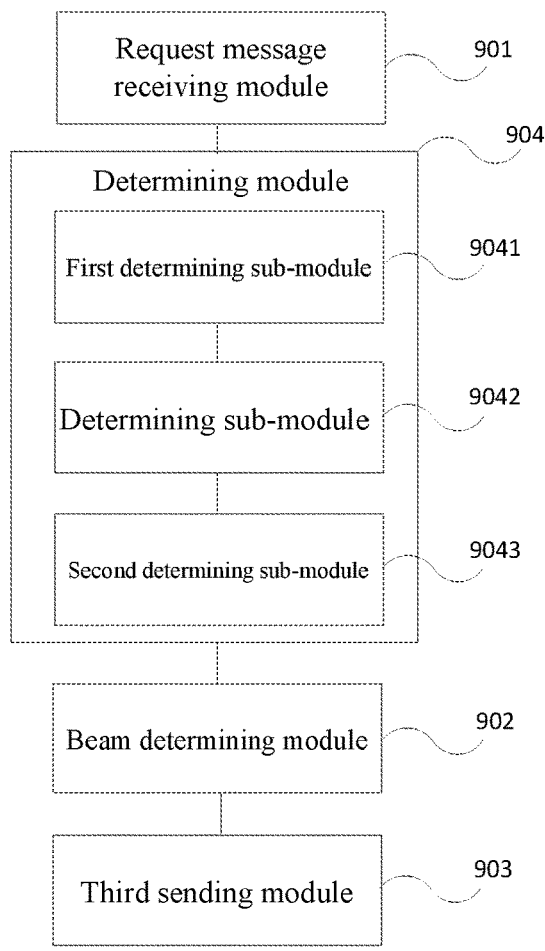
FIG. 11 is a structural schematic diagram of a seventh cell handover apparatus provided by an embodiment of the present disclosure.

Optionally, as shown in FIG. 11, the determining module 904 comprises:

a first determining sub-module 9041 configured to determine beam load corresponding to the beam measurement results;

a determining sub-module 9042 configured to determine in the beam load whether second beams having the load less than or equal to a preset load threshold exist; and a second determining sub-module 9043 configured to allow the terminal to be handed over to the target cell when it is determined that the second beams exist.

Optionally, the beam determining module 902 is configured to determine that a beam with the largest beam measurement result in the second beams is the target beam.

Optionally, the target network device comprises a base station of the target cell or a mobility management server.

In this way, when performing a cell handover, the present disclosure can perform cell measurement based on beam level, and determine a target beam according to the beam measurement results, so that the terminal performs handover by means of the target beam, thereby improving service quality. In addition, in the prior art, after a terminal is handed over to a target cell, it is also required to perform polling measurement on an analog beam of the target cell, and re-initiate a random access request or report appropriate serving information. In this way, not only the air interface resources are wasted, but also the handover delay is greatly increased, thereby affecting the service quality. In the present disclosure, a terminal directly initiates connection on a determined target beam, and does not need to re-initiate a random access request or report appropriate serving information, thereby saving air interface resources and reducing handover delay.

It should be noted that those skilled in the art should be aware that for the convenience and brevity of the description, the specific working process and description of the apparatus described above may refer to the corresponding processes in the above method embodiments, and details will not be repeated herein.

Figure 12:
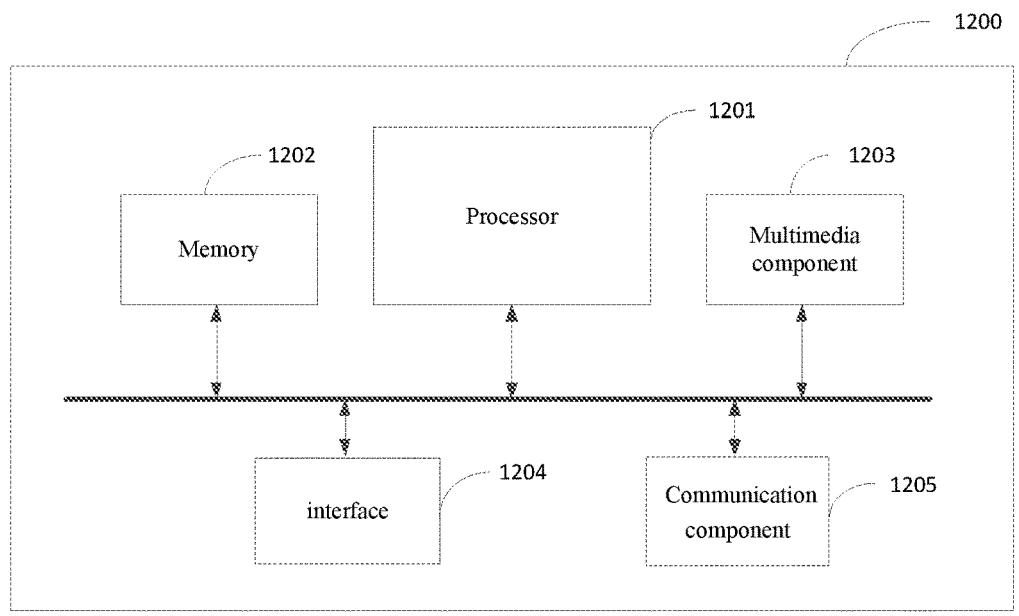
FIG. 12 is a structural schematic diagram of hardware of a cell handover apparatus provided by an embodiment of the present disclosure.

FIG. 12 shows a block diagram of a cell handover apparatus provided by an embodiment of the present disclosure. As shown in FIG. 12, the apparatus may be applied to a serving base station, a terminal or a target network device. The apparatus 1200 may comprise: a processor 1201, a memory 1202, a multimedia component 1203, an input/output (I/O) interface 1204, and a communication component 1205.

The processor 1201 is configured to control an overall operation of the apparatus 1200 to complete all or part of the steps of the cell handover method. The memory 1202 is configured to store various types of data to support operations at the apparatus 1200. The data may comprise an instruction for any application or method operated on the apparatus 1200, and application related data, such as contact data, sent and received message, picture, audio, video, etc.

The memory 1202 may be implemented by any type of volatile or non-volatile storage terminal device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk. The multimedia component 1103 may comprise a screen and an audio component. The screen may be, for example, a touch screen, and the audio component is configured to output and/or input an audio signal. For example, the audio component may comprise a microphone for receiving an external audio signal. The received audio signal may be further stored in memory 1202 or sent via the communication component 1205. The audio component further comprises at least one speaker for outputting an audio signal. The I/O interface 1204 provides an interface between the processor 1201 and other interface modules. The other interface modules may be keyboards, mice, buttons, and the like. These buttons can be virtual buttons or physical buttons. The communication component 1205 is configured to perform wired or wireless communication between the apparatus 1200 and other terminal devices. The wireless communication comprises, for example, Wi-Fi, Bluetooth, Near Field Communication (NFC), 2G, 3G or 4G, or a combination of one or more thereof, so the communication component 1205 correspondingly may comprise: a Wi-Fi module, a Bluetooth module, and an NFC module.

In an exemplary embodiment, the apparatus 1200 may be implemented by one or more of Application Specific Integrated Circuit (ASIC), Digital Signal Processor (DSP), and Digital Signal Processing Device (DSPD), Programmable Logic Device (PLD), Field Programmable Gate Array (FPGA), controller, microcontroller, microprocessor or other electronic components to perform the cell handover method.

An embodiment of the present disclosure further provides a non-transitory computer readable storage medium 1, wherein the non-transitory computer readable storage medium 1 comprises one or more programs for performing a cell handover method. The method comprises: sending measurement configuration information to a terminal to be handed over, wherein the measurement configuration information comprises beam configuration information; after the terminal measures neighboring cells according to the measurement configuration information, receiving beam measurement results sent by the terminal according to the beam configuration information; determining a target cell to which the terminal is to be handed over according to the beam measurement results, and handing over the terminal to the target cell by means of a target network device.

Optionally, the beam configuration information comprises a reported threshold and a reported number of the beam measurement results.

Optionally, before determining a target cell to which the terminal is to be handed over according to the beam measurement result, the method further comprises: acquiring a moving speed of the terminal; determining a target cell to which the terminal is to be handed over according to the beam measurement results comprises: determining, according to the moving speed and the beam measurement results, a target cell to which the terminal is to be handed over.

Optionally, determining, according to the moving speed and the beam measurement results, a target cell to which the terminal is to be handed over comprises: when the moving speed is greater than or equal to a first preset speed threshold, determining, from the neighboring cells, to-be-determined cells having serving quality greater than or equal to a first preset quality threshold, and determining the number of first beams of each to-be-determined cell, and determining a to-be-determined cell with the largest number of the first beams as the target cell, wherein the first beams are beams having the beam measurement result greater than or equal to the reported threshold; when the moving speed is less than the first preset speed threshold and greater than or equal to a second preset speed threshold, determining a cell with the highest serving quality as the target cell; or determining any cell in the to-be-determined cells as the target cell; and when the moving speed is less than the second preset speed threshold, determining the cell with the highest serving quality as the target cell.

Optionally, handing over the terminal to the target cell by means of a target network device comprises:

sending a handover request message to the target network device, wherein the handover request message comprises the beam measurement results of the target cell, so that the target network device determines, according to the beam measurement results, whether the terminal is allowed to be handed over to the target cell; when the target network device allows the terminal to be handed over to the target cell, and after the target network device determines a target beam in the target cell according to the beam measurement results, receiving a handover response message sent by the target network device, wherein the handover response message comprises a beam identifier of the target beam; and sending, to the terminal, a handover indication message that comprises the beam identifier, so that the terminal is handed over to the target cell by means of the target beam according to the beam identifier.

An embodiment of the present disclosure further provides a terminal 1, comprising:

The above non-transitory computer readable storage medium 1; and one or more processors for executing a program in the non-transitory computer readable storage medium 1.

An embodiment of the present disclosure further provides a non-transitory computer readable storage medium 2, wherein the non-transitory computer readable storage medium 2 comprises one or more programs for performing a cell handover method. The method comprises: receiving measurement configuration information sent by a serving base station of a current cell, wherein the measurement configuration information comprises beam configuration information; measuring, according to the measurement configuration information, beams of neighboring cells of the current cell; sending beam measurement results to the serving base station according to the beam configuration information; after the serving base station determines a target cell to which the terminal is to be handed over according to the beam measurement results, receiving a handover instruction message sent by the serving base station; and handing over to the target cell according to the handover instruction message.

Optionally, the beam configuration information comprises a reported threshold and a reported number of the beam measurement results. Sending beam measurement results to the serving base station according to the beam configuration information comprises: determining the number of beams on which the beam measurement result is greater than or equal to the reported threshold; when the number of beams is greater than or equal to the reported number, sending the first beam measurement results to the serving base station, wherein the first beam measurement result comprise beam measurement values of M beams with the highest beam measurement results in the neighboring cell, where M is the reported number; and when the number of beams is less than the reported number, sending the second beam measurement results to the serving base station, wherein the second beam measurement results comprise the beam measurement values of N beams with the highest beam measurement results in the neighboring cell, where N is the number of beams.

Optionally, the handover instruction message comprises a beam identifier of the target beam; handing over to the target cell according to the handover instruction message comprises: handing over to the target cell by means of the target beam according to the beam identifier.

An embodiment of the present disclosure further provides a terminal 2, comprising: the above non-transitory computer readable storage medium 2; and one or more processors for executing a program in the non-transitory computer readable storage medium 2.

An embodiment of the present disclosure further provides a non-transitory computer readable storage medium 3, wherein the non-transitory computer readable storage medium 3 comprises one or more programs for performing a cell handover method. The method comprises: receiving a handover request message sent by a serving base station, wherein the handover request message comprises the beam measurement results of a target cell determined by the serving base station; determining a target beam in the target cell according to the beam measurement results; and sending a handover response message to the serving base station, wherein the handover response message comprises a beam identifier of the target beam, so that the serving base station hands over the terminal to the target cell by means of the target beam.

Optionally, before determining a target beam in the target cell according to the beam measurement results, the method further comprises: determining, according to the beam measurement results, whether the terminal is allowed to be handed over to the target cell; determining a target beam in the target cell according to the beam measurement results comprises: when it is determined according to the beam measurement results that the terminal is allowed to be handed over to the target cell, determining a target beam in the target cell according to the beam measurement results.

Optionally, determining, according to the beam measurement results, whether the terminal is allowed to be handed over to the target cell comprises: determining beam load corresponding to the beam measurement results; determining, in the beam load, whether second beams having the load less than or equal to a preset load threshold exist; and when it is determined that the second beams exist, allowing the terminal to be handed over to the target cell.

Optionally, determining a target beam in the target cell according to the beam measurement results comprises: determining that a beam with a largest beam measurement result in the second beams is the target beam.

Optionally, the target network device comprises a base station of the target cell or a mobility management server.

An embodiment of the present disclosure further provides a terminal 3, comprising: the non-transitory computer readable storage medium 3; and one or more processors for executing a program in the non-transitory computer readable storage medium 3.

The preferred embodiments of the present disclosure have been described in detail above in conjunction with the drawings. However, the present disclosure is not limited to the specific details of the above embodiments, and various simple variations can be made to the technical solutions of the present disclosure within the scope of the technical concept of the present disclosure. These simple variations are all within the protection scope of the present disclosure.

It should be further noted that the specific technical features described in the above specific embodiments may be combined in any suitable manner without contradiction. In order to avoid unnecessary repetition, the present disclosure will not elaborate separately on various possible combinations.

In addition, any combination of various embodiments of the present disclosure may be also made as long as it does not deviate from the idea of the present disclosure, and should also be regarded as the contents of the present disclosure.

The invention claimed is:

1. A cell handover method applied to a serving base station, comprising:
sending measurement configuration information to a terminal to be handed over,
wherein the measurement configuration information comprises beam configuration information;
after the terminal measures neighboring cells according to the measurement configuration information, receiving beam measurement results sent by the terminal according to the beam configuration information; and
determining, according to the beam measurement results, a target cell to which the terminal is to be handed over, and handing over the terminal to the target cell by means of a target network device;

wherein the beam configuration information comprises a reported threshold and a reported number of the beam measurement results;

wherein before said determining a target cell to which the terminal is to be handed over according to the beam measurement results, the method further comprises:

acquiring a moving speed of the terminal;

said determining a target cell to which the terminal is to be handed over according to the beam measurement results comprises:

when the moving speed is greater than or equal to a first preset speed threshold, determining, from the neighboring cells, the to-be-determined cells having serving quality greater than or equal to a first preset quality threshold, and determining the number of first beams of each to-be-determined cell, and determining the to-be-determined cell with the largest number of the first beams as the target cell, wherein the first beams are beams having the beam measurement result greater than or equal to the reported threshold;

when the moving speed is less than the first preset speed threshold and greater than or equal to a second preset speed threshold, determining the cell with the highest serving quality as the target cell; or determining any cell in the to-be-determined cells as the target cell; and when the moving speed is less than the second preset speed threshold, determining the cell with the highest serving quality as the target cell.

2. The method of claim 1, wherein said handing over the terminal to the target cell by means of a target network device comprises:

sending a handover request message to the target network device, wherein the handover request message comprises the beam measurement results of the target cell, so that the target network device determines, according to the beam measurement results, whether the terminal is allowed to be handed over to the target cell;

after the target network device allows the terminal to be handed over to the target cell, and determines a target beam in the target cell according to the beam measurement results, receiving a handover response message sent by the target network device, wherein the handover response message comprises a beam identifier of the target beam; and sending, to the terminal, a handover indication message that comprises the beam identifier, so that the terminal is handed over to the target cell by means of the target beam according to the beam identifier.

3. A non-transitory computer readable storage medium, wherein the non-transitory computer readable storage medium comprises one or more programs for executing the method of claim 1.

4. A serving base station, comprising:
the non-transitory computer readable storage medium of claim 3; and
one or more processors for executing a program in the non-transitory computer readable storage medium.

5. A cell handover method applied to a terminal, comprising:

receiving measurement configuration information sent by a serving base station of a current cell, wherein the measurement configuration information comprises beam configuration information;

measuring, according to the measurement configuration information, beams of neighboring cells of the current cell;

sending beam measurement results to the serving base station according to the beam configuration information;

after the serving base station determines a target cell to which the terminal is to be handed over according to the beam measurement results, receiving a handover instruction message sent by the serving base station; and handing over to the target cell according to the handover instruction message;

wherein the beam configuration information comprises a reported threshold and a reported number of the beam measurement results, and said sending beam measurement results to the serving base station according to the beam configuration information comprises:

determining the number of beams on which the beam measurement result is greater than or equal to the reported threshold;

when the number of beams is greater than or equal to the reported number, sending the first beam measurement results to the serving base station, wherein the first beam measurement results comprise the beam measurement values of M beams with the highest beam measurement results in the neighboring cell, where M is the reported number; and when the number of beams is less than the reported number, sending the second beam measurement results to the serving base station, wherein the second beam measurement results comprises the beam measurement values of N beams with the highest beam measurement results in the neighboring cell, where N is the number of beams.

6. The method of claim 5, wherein the handover instruction message comprises a beam identifier of the target beam;

said handing over to the target cell according to the handover instruction message comprises:

handing over to the target cell by means of the target beam according to the beam identifier.

7. A non-transitory computer readable storage medium, wherein the non-transitory computer readable storage medium comprises one or more programs for executing the method of claim 5.

8. A serving base station, comprising:
the non-transitory computer readable storage medium of claim 7; and
one or more processors for executing a program in the non-transitory computer readable storage medium.

9. A cell handover method applied to a target network device, comprising:

receiving a handover request message sent by a serving base station, wherein the handover request message comprises beam measurement results of a target cell determined by the serving base station;

determining a target beam in the target cell according to the beam measurement results; and sending a handover response message to the serving base station, wherein the handover response message comprises a beam identifier of the target beam, so that the serving base station hands over a terminal to the target cell by means of the target beam;

wherein before said determining a target beam in the target cell according to the beam measurement results, the method further comprises:

determining, according to the beam measurement results, whether the terminal is allowed to be handed over to the target cell;

said determining a target beam in the target cell according to the beam measurement results comprises:

when it is determined according to the beam measurement results that the terminal is allowed to be handed over to the target cell, determining a target beam in the target cell according to the beam measurement results;

wherein said determining, according to the beam measurement results, whether the terminal is allowed to be handed over to the target cell comprises:

determining beam load corresponding to the beam measurement results;

determining, in the beam load, whether second beams having the load less than or equal to a preset load threshold exist; and when it is determined that the second beams exist, allowing the terminal to be handed over to the target cell.

10. The method of claim 9, wherein said determining a target beam in the target cell according to the beam measurement result comprises:

determining that the beam with the largest beam measurement result in the second beams is the target beam.

11. The method of claim 9, wherein the target network device comprises a base station of the target cell or a mobility management server.

12. A non-transitory computer readable storage medium, wherein the non-transitory computer readable storage medium comprises one or more programs for executing the method of claim 9.

13. A serving base station, comprising:

the non-transitory computer readable storage medium of claim 12; and one or more processors for executing a program in the non-transitory computer readable storage medium.

* * * * *

UNITED STATES PATENT AND TRADEMARK OFFICE
CERTIFICATE OF CORRECTION

PATENT NO. : 11,019,549 B2
APPLICATION NO. : 16/507596
DATED : May 25, 2021
INVENTOR(S) : Huang et al.

Page 1 of 1

It is certified that error appears in the above-identified patent and that said Letters Patent is hereby corrected as shown below:

In the Claims

Column 18, Claim 8, Line 47, "serving base station" should be -terminal-

Column 20, Claim 13, Line 15, "serving base station" should be -target network device- Signed and Sealed this
Fourth Day of April, 2023

Katherine Kelly Vidal
*Director of the United States Patent and Trademark Office*